US006996811B2

(12) United States Patent
Nishioka et al.

(10) Patent No.: US 6,996,811 B2
(45) Date of Patent: Feb. 7, 2006

(54) METHOD FOR CREATING A PERFORMANCE MODEL OF AN APPLICATION PROGRAM ADJUSTED WITH AN EXECUTION RESULT OF THE APPLICATION PROGRAM

(75) Inventors: Daisuke Nishioka, Hino (JP); Yusaku Yamamoto, New York, NY (US)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 09/946,758

(22) Filed: Sep. 6, 2001

(65) Prior Publication Data

US 2002/0129329 A1    Sep. 12, 2002

(30) Foreign Application Priority Data

Jan. 22, 2001    (JP)    ............................. 2001-012606

(51) Int. Cl.
*G06F 9/44*    (2006.01)
(52) U.S. Cl. ...................... 717/135; 717/130; 717/137; 717/151; 717/120; 717/101; 703/22
(58) Field of Classification Search ................ 717/130, 717/137, 154, 158, 101, 110, 120–121, 131–136, 717/151, 100, 102–109, 111–113; 703/13, 703/22, 23; 707/104.1
See application file for complete search history.

(56) References Cited

FOREIGN PATENT DOCUMENTS

| JP | A-9-134341 | 5/1997 |
| JP | A-10-187495 | 7/1998 |
| JP | A-10-254727 | 9/1998 |
| JP | A-11-39378 | 2/1999 |

OTHER PUBLICATIONS

Anderson et al., Continuous Profiling: Where Have All the Cycles Gone?, 1997, Proceedings of the 16th ACM Symposium on Operating Systems Principles.*
James R. Larus, Whole Program Paths, May 1999, SIGPLAN '99 (PLDI), Atlanta, GA, USA.*
Ito et al., Theoretical Aspects of Computer Software, Sep. 1991, International Conference TACS '91 Sendai, Japan, Sep. 24 27, 1991 Proceedings.*
A.V. Aho et al, "Principles of Compiler Design", Addison-Wesley Publishing Company, pp. 412-415 and 444-445, 1986.

* cited by examiner

*Primary Examiner*—Antony Nguyen-Ba
(74) *Attorney, Agent, or Firm*—Mattingly, Stanger, Malur & Brundidge, P.C.

(57) ABSTRACT

There are previously involved: a program source-into which a log output instruction for adjusting an application model is embedded; a simulation source for performance simulation corresponding to the program source; and initial parameter values for adjusting the application model. Software parts capable of storing a history of parameter values after adjustment are combined to create an application program and the application model. Logs obtained by executing the application program and the application model are compared, and the parameters of the application model are automatically adjusted in conformance with actual measurement results of the application program. The adjusting result is fed back to the application model, and added to the history of original software parts, in which the parameter initial values are changed at need.

7 Claims, 8 Drawing Sheets

METHOD FOR CREATING A PERFORMANCE MODEL OF AN APPLICATION PROGRAM ADJUSTED WITH AN EXECUTION RESULT OF THE APPLICATION PROGRAM

BACKGROUND OF THE INVENTION

The present invention relates to a method for creating an application program and an application model for performance simulation in an information system, and a method for adjusting and managing the application model.

At the time of making the performance simulation of an information system, an application model for an application program for use is required, and thereby must be created if it is not provided.

The application model is typically composed of an amount of resource consumption, such as an amount of instructions to be consumed along with the execution of the application program, an amount of I/O use for disk or network, and a use amount of memory, and the description of the operation of the application program including a conditional branch. Therefore, when a new application model is created, the amount of resource consumption is measured from the outside, or the operation of the application program is estimated from the experiments. The application model created in this manner is specific to the application program in the environment of practical measurements, whereby the application model in varying environments can be obtained by multiplying the total amount of resource consumption by a certain constant.

On one hand, when a source for the application program is present, the operation of the application program can be correctly described by analyzing the source, and the amount of resource consumption can be obtained by analyzing an output log of instructions for measuring the performance that is embedded into the source. Therefore, the application model can be reconstructed by acquiring a log by rerun even in varying environments.

Also, in the creation of the application program, there is a method of creating the application program with less amount of description by employing a combination of software parts reusable such as a class library and a component.

When the application program and the application model are developed separately as conventionally, the following problems will arise.
(1) A duplicate process of developing an application program and creating an application model occurs.
(2) The description of the operation of the application model by estimation is incorrect.
(3) A large number of steps are required for measuring various amounts of resource consumption.
(4) The application model creation is required for each application program, and the reuse of the application model is hard.
(5) When the environment is changed, the influence on the application model is unknown.
(6) Sharing the adjusting result of the application model as the knowledge is difficult.

SUMMARY OF THE INVENTION

In order to solve the above-mentioned problems, it is an object of the present invention to provide a method for creating an application program and an application model thereof at the same time, a method for automatically adjusting the application model, and a development cycle for sharing and reusing the adjusting result.

To create the application program and its application model at the same time, the method for creating a software model according to the invention involves a program source into which a log output instruction for adjusting the application model is embedded, a simulation source for performance simulation corresponding to the program source, and the initial parameter values for adjusting the application model, and prepares the software parts capable of storing a history of parameter values after adjustment, thereby creating the application program and the application model in combination of software parts.

Also, the log for adjusting the application model is embedded into the created application program and application model, and the parameters of the application model are automatically adjusted by comparing the logs output, whereby the adjusting result is fed back to the application model.

The adjusting result is added to the history of adjusting the software parts, and the initial parameter values are changed, if needed, whereby the adjusting result can be reused. Further, at the time of making the performance simulation by applying the application model to the real environment, the parameters are adjusted in conformance to the environment, whereby the performance may be predicted more accurately.

As a consequence of the parameter adjustment, the initial parameter values for the application model to be constructed and the history of parameter values after adjustment are circulated independently of the software parts, and applied to the software parts of the user, whereby the high precision application model may be shared.

As described above, in the present invention, the application program and the application model are created by assembling the software parts, thereby avoiding the duplicate development, whereby the operation of the application program can be fed back correctly. The process of adjusting the parameters is automated by outputting the same logs from the application program and the application model, and comparing the logs, whereby the measuring time can be reduced. Further, since a parameter is prepared for each of the software parts, the influence of each portion of the application program on the execution environment can be known. The history of adjusting the parameter-is circulated independently of the software parts, whereby the knowledge of the application model that varies depending on the environment can be shared.

DETAILED DESCRIPTION OF THE EMBODIMENTS

Figure 1:
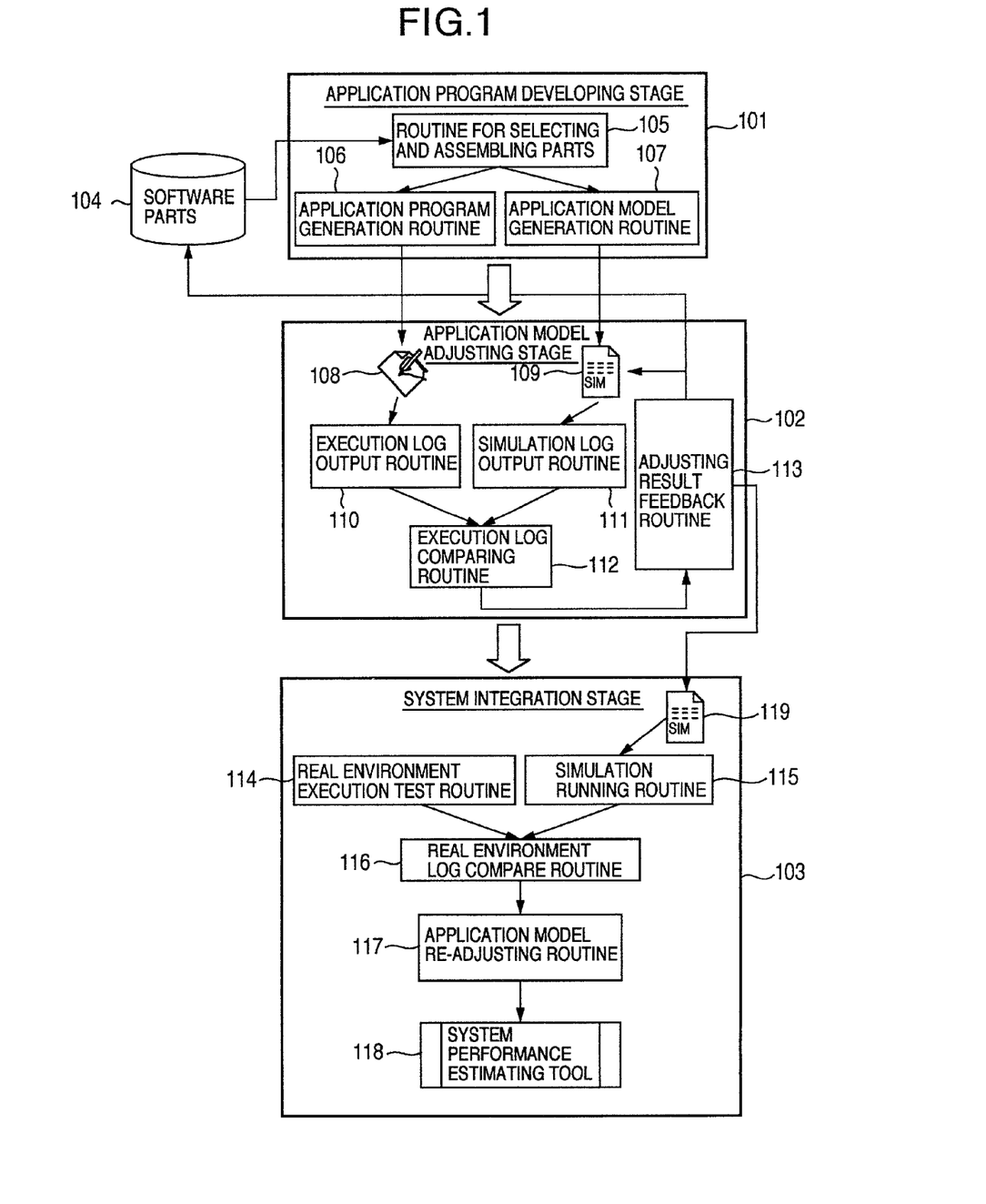
FIG. 1 is a block diagram showing a process of creating a software model according to one embodiment of the present invention.

FIG. 1 is an explanatory diagram showing a configuration of a method for creating a software model according to one embodiment of the present invention.

A software model creating section comprises an application program developing stage 101 and an application model adjusting stage 102, as shown in FIG. 1. The application program developing stage 101 is composed of a routine for selecting and assembling parts 105 for selecting and assembling necessary parts from the software parts 104 stored in the disk or the like, an application program generation routine 106 for generating an application program from the assembled result, and an application model generation routine 107 for generating an application model from the assembled result.

In the application program developing stage 101, an application program 108 and an application model 109 are generated. The application model adjusting stage 102 is composed of an execution log output routine 110 for obtaining an execution log by executing the application program 108, a simulation log output log 111 for obtaining a simulation log for the application model 109 by executing a simulation, an execution log comparing routine 112 for comparing both logs to determine a parameter modifier, and an adjusting result feedback routine 113 for modifying the application model 109 in accordance with the parameter modifier and adding to a parameter history of the software parts 104.

In the application model adjusting stage 102, the application model 109 is adjusted in accordance with the execution result of the application program 108. The application model adjusting stage also involves outputting an adjusted application model 119 in which the adjusted parameter is fed back to the application model 109, and adding the parameter modifier to the history of the software parts 104.

In a system integration stage 103, the adjusted application model 119 generated in the application program developing stage 101 and adjusted in the application model adjusting stage 102 is applied to the real environment to estimate the system performance in making system integration with a performance estimating simulator. That is, for the application program 108 and the adjusted application model 119, a same process as the application model adjusting stage 102 is performed to make fine adjustment of the application model 119 for the real environment.

The system integration stage 103 is composed of a real environment execution test routine 114 for executing the application program 108 in the real environment to obtain an execution log, a simulation running routine 115 for running a simulation of the adjusted application model 119 to obtain a simulation log, a real environment log compare routine 116, an application model re-adjusting routine 117 for making fine adjustment of the adjusted application model 119 by comparing both logs, and a system performance estimating tool 118 for estimating the system performance through simulation employing the finely adjusted application model.

Figure 2:
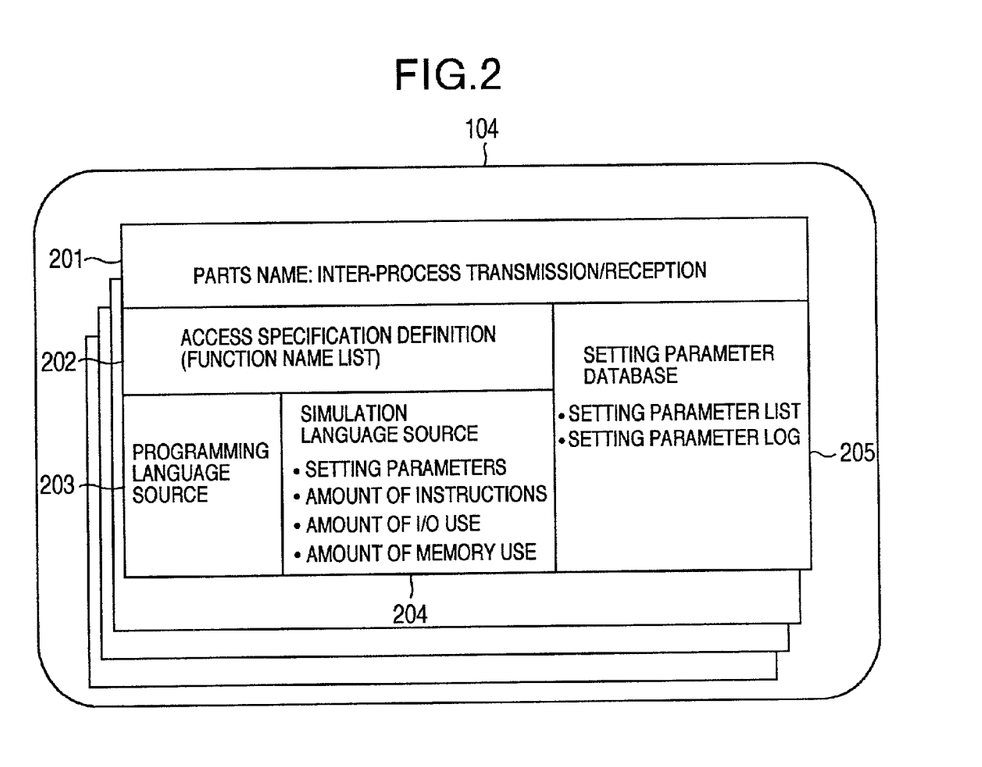
FIG. 2 is an explanatory diagram for explaining software parts.

Referring now to FIG. 2, the software parts 104 will be described below. The software parts 104 comprise a plurality of parts classified according to their functions, and a configuration example of one software part is shown in FIG. 2. One software part 201 consists of a name (parts name: inter-process transmission/reception) for designating the function, an access specification definition (function name list) 202 for accessing the function, a programming language source 203, a simulation language source 204, and a setting parameter database 205. The simulation language source 204 has the setting parameters for adjustment such as an amount of instructions, an amount of I/O use, and an amount of memory use embedded for the application program 108.

The parameters adjusted in the application model adjusting stage 102 are fed back to the parameters within the application model 109 and the setting parameter database 205 within the software part 201. The setting parameter database 205 stores a list of setting parameters and a history of parameter modifier.

Figure 3:
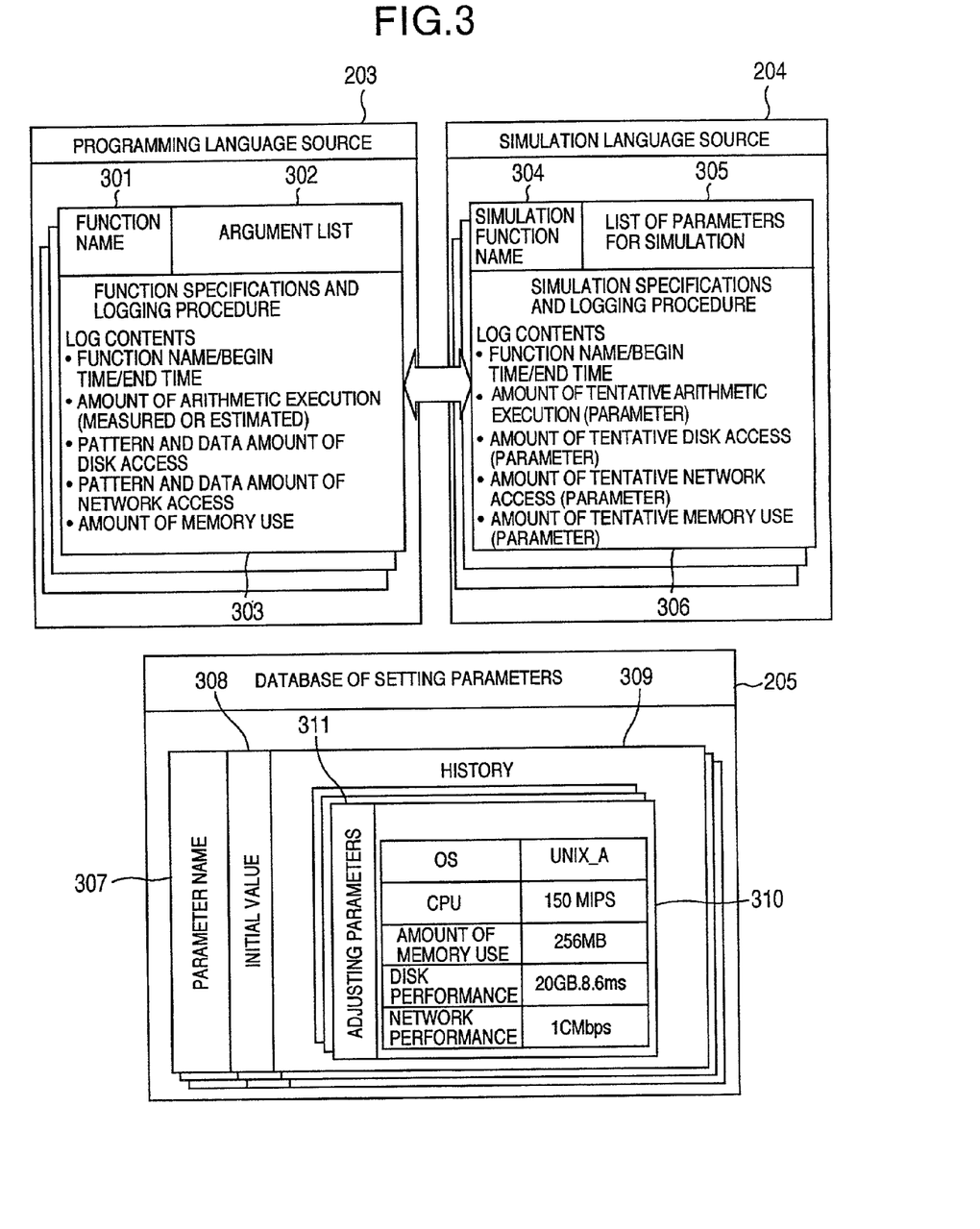
FIG. 3 is a detailed explanatory diagram for explaining one software part.

Referring now to FIG. 3, the details inside one software part 201 will be described below. One software part 201 consists of the programming language source 203, the simulation language source 204, and the setting parameter database 205, as previously described. The programming language source 203 and the simulation language source 204 have packaged the functions defined in the access specification definition 202. Also, each of the programming language source 203 and the simulation language source 204 has an instruction statement inserted to output a log at the same processing position.

One function of the programming language source 203 has a function name 301, an argument list 302, and a function specifications and logging procedure 303. Correspondingly, one function of the simulation language source 204 has a simulation function name 304, a list of parameters for simulation 305 necessary for simulation, and a simulation specifications and logging procedure 306. The log output from the function specifications and logging procedure 306 and the log output from the simulation specifications and logging procedure 306 have a relation between the actual measurement and the setting parameters.

The setting parameter database 205 comprises a combination of a parameter name 307, an initial value of parameter 308, and a history 309 for each parameter. The history 309 comprises a parameter modifier (adjusting parameter) 311 and an adjusted condition (execution condition 310).

Figure 4:
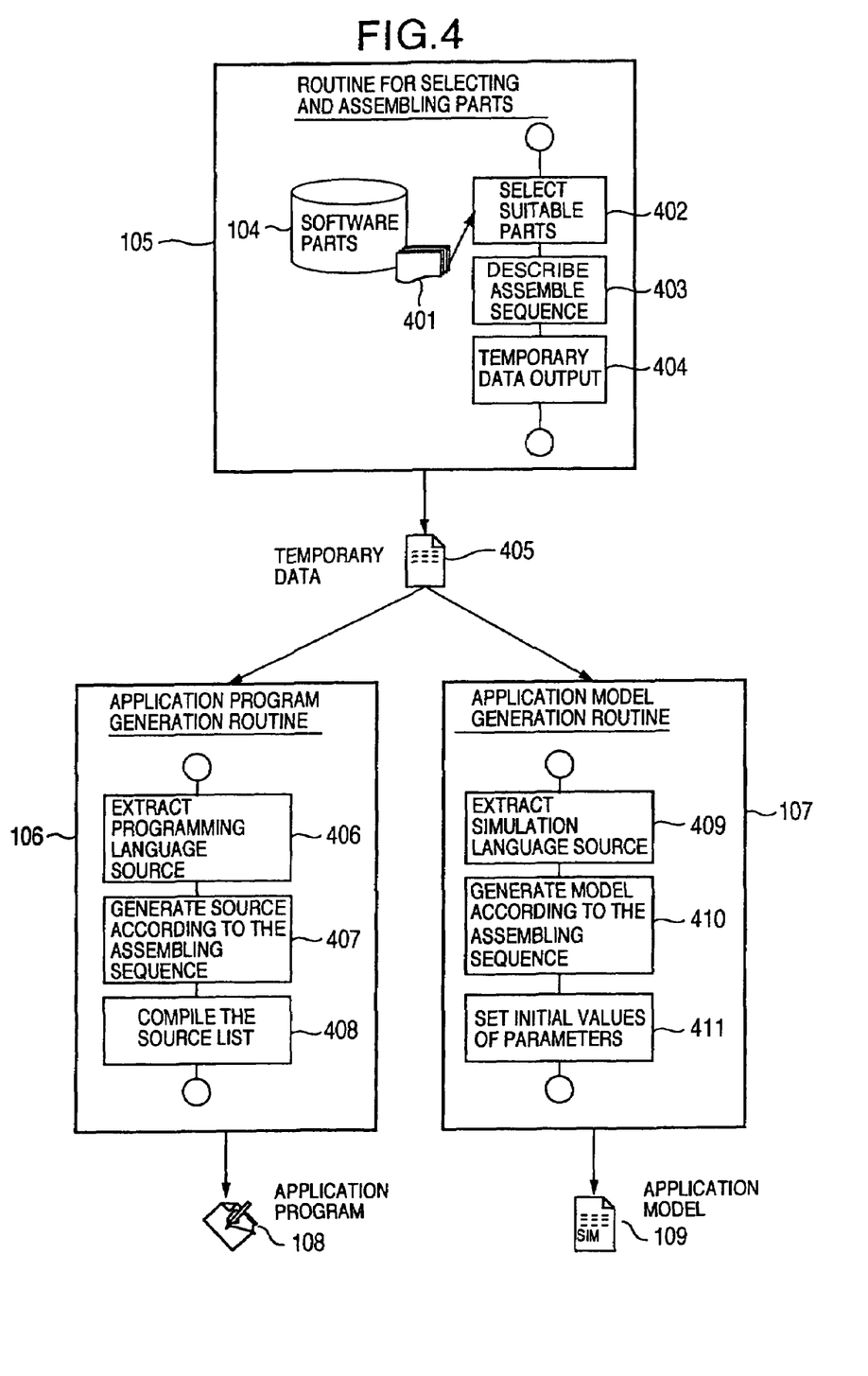
FIG. 4 is an explanatory diagram for explaining an application program developing stage.

Referring now to FIG. 4, the application program developing stage 101 will be described below. The application program developing stage 101 involves assembling each software part 401 in the software parts 104 in the routine for selecting and assembling parts 105 to produce the temporary data 405. The temporary data 405 is translated by the application program generation routine 106 to generate the application program 108. Also, the application model 109 is generated from the temporary data 405 by the application model generation routine 107.

A process flow of the routine for selecting and assembling parts 105 will be as follows. First of all, a part 401 necessary for creating the application program is selected by selecting suitable parts (block 402). Then, the specification for linkage between parts is determined by describing assemble sequence (block 403). Thereafter, the temporary data 405 for collecting the settings is output (block 404).

The application program generation routine 106 inputs the temporary data 405, extracts a programming language source portion from each software part 401 (block 406), and generates the source of the whole application program according to the assembling sequence (block 407). After generating the source, the application program generation routine 106 compiles the source (block 408) and outputs the application program 108.

The application model generation routine 107, which involves no compile operation, extracts the simulation language source from the temporary data 405 (block 409), and makes the model generation according to the assembling sequence (block 410) to generate the application model 109.

Figure 5:
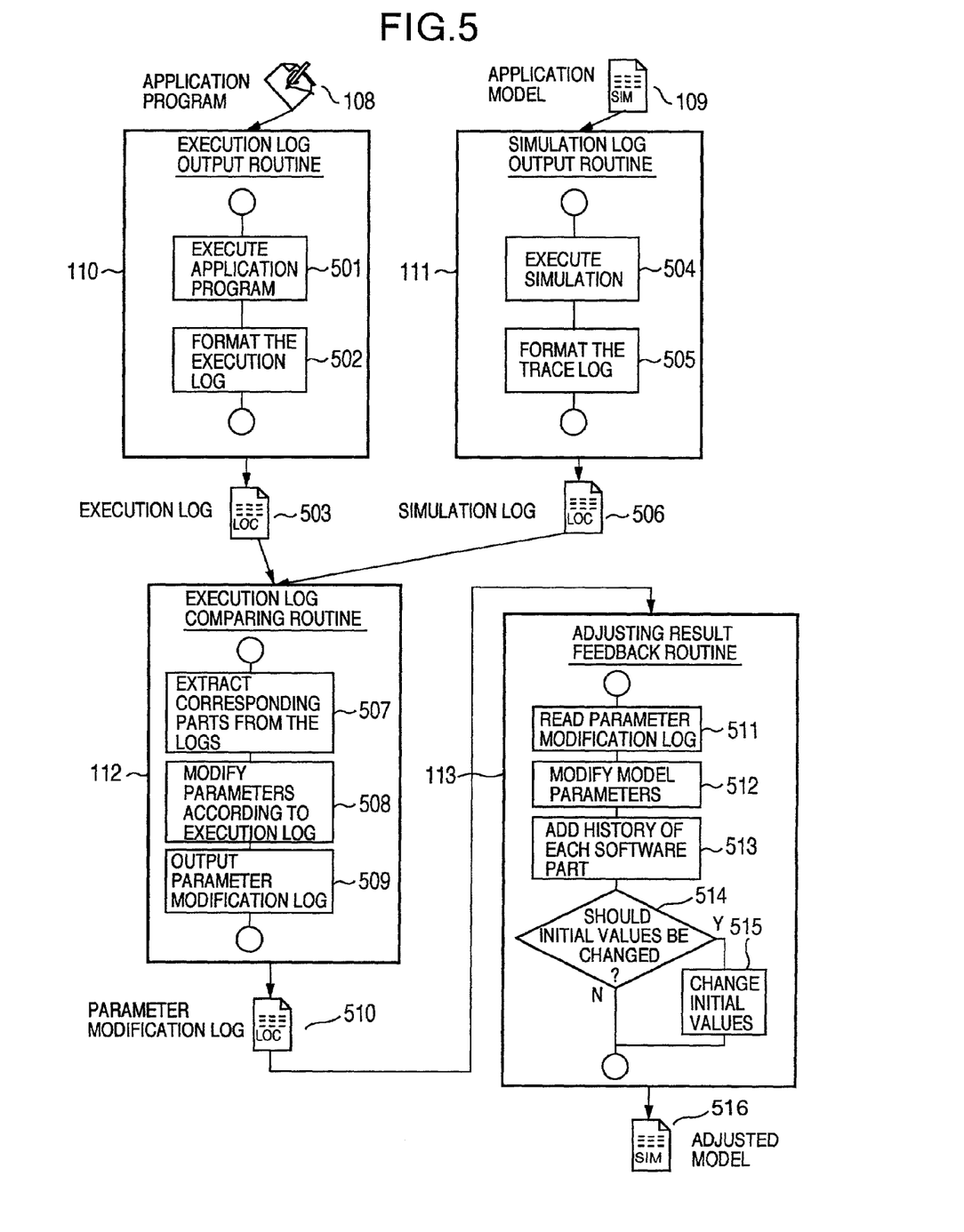
FIG. 5 is an explanatory diagram for explaining an application model adjusting stage.

Next, referring now to FIG. 5, the application model adjusting stage 102 will be described below. The application model adjusting stage 102 involves inputting the application program 108 generated in the application program developing stage 101 and the application model 109, and outputting the adjusted application model 119 (an adjusted model 516 in FIG. 5).

The execution log output routine 110 acquires an execution log of the application program 108. First of all, the application program is executed (block 501) to acquire an output log. Thereafter, the output log is formatted (block 502) to obtain the execution log 503.

The simulation log output routine 111 acquires a simulation log 506 of the application model 109. First of all, the simulation of the application model 109 is executed (block 504) to acquire a trace log of simulation. Thereafter, the trace log is formatted, at need (block 505) to obtain the simulation log 506.

The execution log comparing routine 112 inputs the execution log 503 and the simulation log 506, compares them, and outputs a parameter to be modified and its parameter modifier to a parameter modification log 510. First of all, the execution log comparing routine 112 compares the execution log 503 and the simulation log 506, and extracts the corresponding parts from the logs (block 507). Thereafter, it modifies the parameters (block 508) so that the amount of resource consumption in the simulation log 506 may be equal to the amount of resource consumption in the execution log 503, and outputs the parameter modification log with the modified parameters (block 509) to obtain the parameter modification log 510.

An adjusting result feedback routine reads the parameter modification log 510, and makes the parameter modification of the application model 109 and the history update of software parts 104. First of all, the adjusting result feedback routine reads the parameter modification log (block 511), and modifies the model parameters for the application model 109 (block 512) to output an adjusted model 516. Also, it adds the history of each software part 401 in the software parts 104 (block 513). At this time, a determination 514 whether or not the initial values should be changed is made, such as when the initial values set in the setting parameter database 206 greatly deviate from the history in the past. If so, it changes the initial values (block 515).

Figure 6:
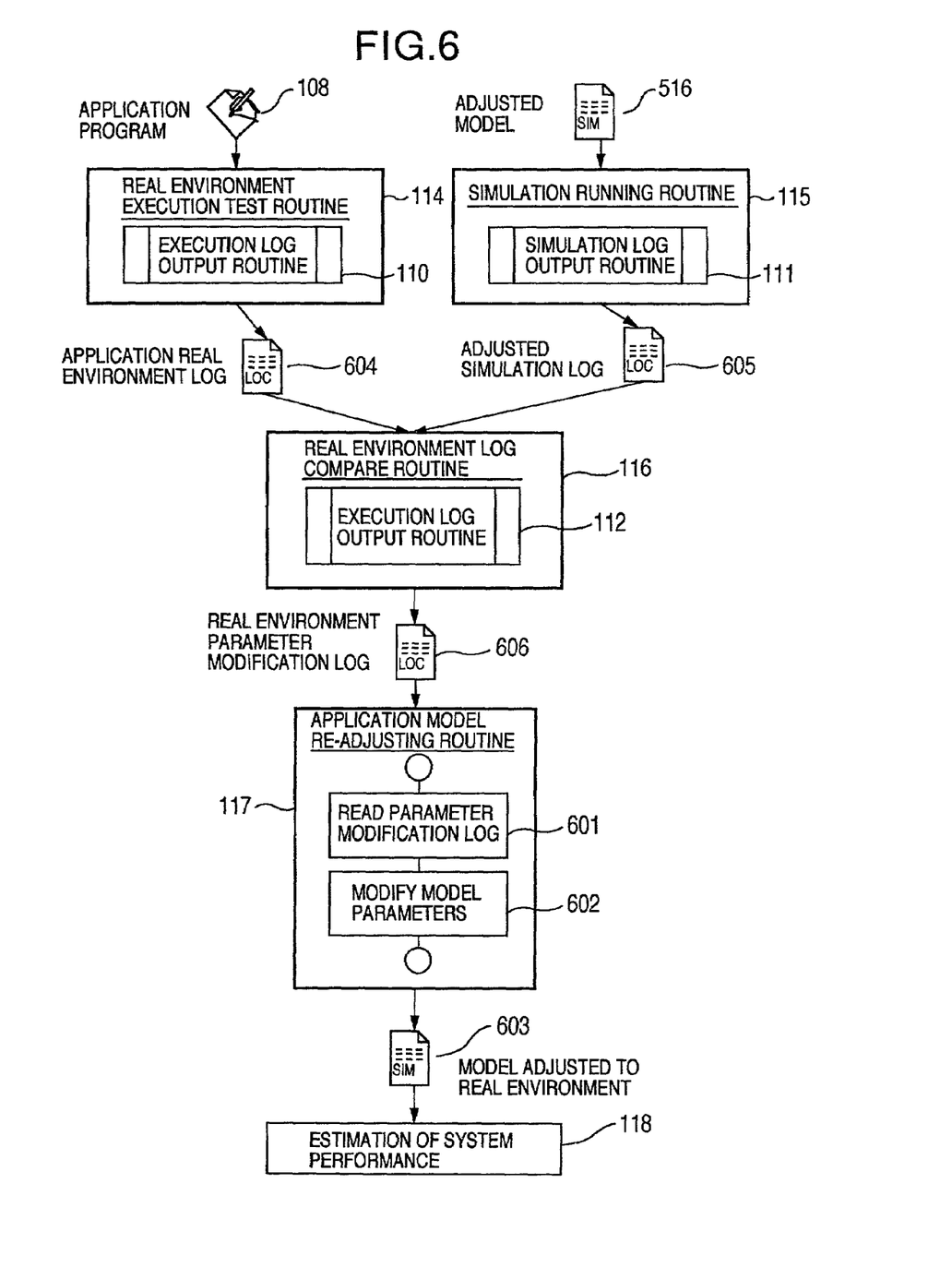
FIG. 6 is an explanatory diagram for explaining a system integration stage.

Referring now to FIG. 6, the system integration stage 103 will be described below. The system integration stage 103 is a process for estimating the system performance at the time of making the system integration in the real environment employing the application program 108 generated in the application program developing stage 101, whereby the system performance is estimated by readjusting a difference between the environment for creating the application model and the real environment.

A real environment execution test routine 114 inputs the application program 108, and acquires an application real environment log 604 by calling the execution log output routine 110. Similarly, a simulation running routine 115 inputs the adjusted model 516 and acquires an adjusted simulation log 605 by calling the simulation log output routine 111.

A real environment log comparing routine (real environment parameter modification log comparing routine) 116 compares the application real environment log 604 and the adjusted simulation log 605 by calling the execution log comparing routine 112, and outputs a real environment parameter modification log 606. An application model re-adjusting routine 117 reads the real environment parameter modification log 606 (block 601), modifies the model parameters for the adjusted model 516 according to the real environment (block 602), and makes estimation of system performance with a model adjusted to real environment 603 adapted to the real environment (block 118). At this time, the system integrator may add some history to the software parts.

Figure 7:
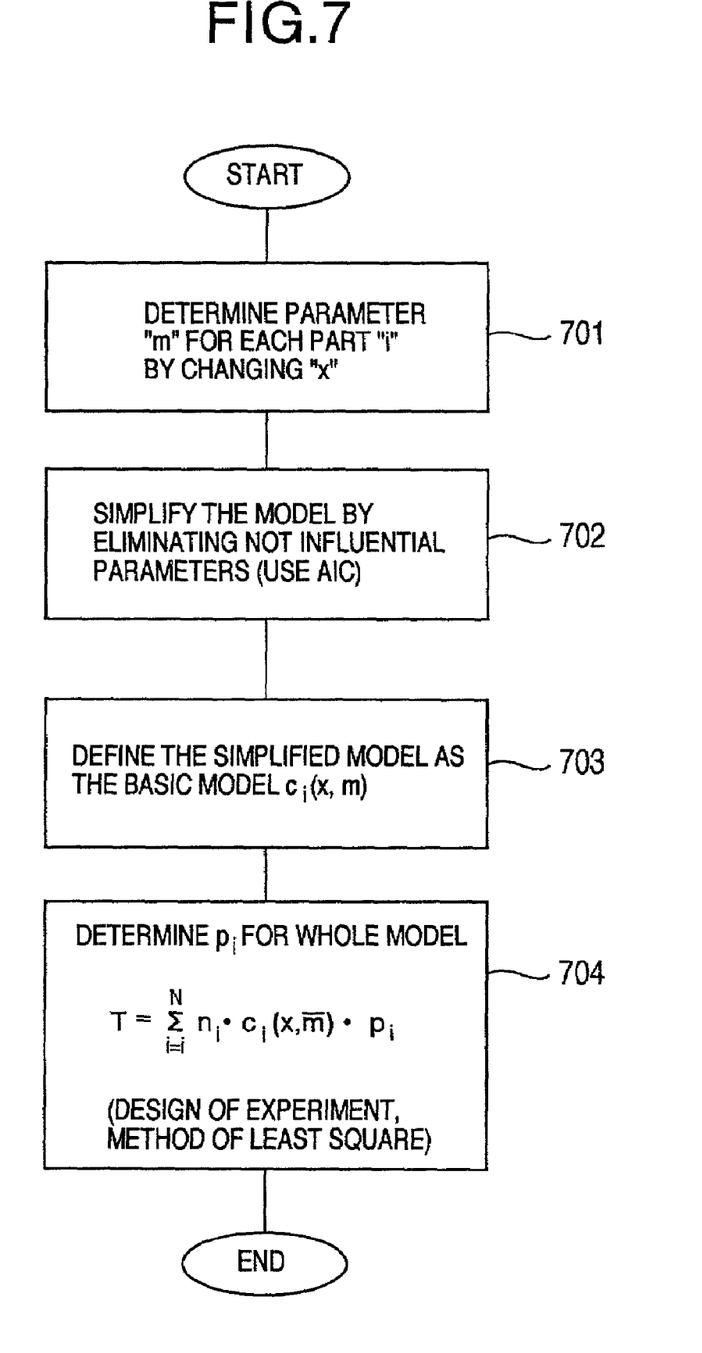
FIG. 7 is a flowchart showing a parameter adjusting method.

Next, referring now to FIG. 7, one specific example of the parameter adjusting method will be described below. First of all, the parameter adjusting model for the application model is defined in an expression (1) under the following prerequisite conditions.

$$T = T(x, m, p) = \sum_{i=1}^{N} n_i \cdot c_i(x, m) \cdot p_i \quad (1)$$

Where the variables are defined such as:
T: Total execution time
N: Number of parts
$n_1$: Number of callings for the part n
$c_1(x,m)$: Execution time model for part i with the input x and machine parameter m
$p_1$: Probability of callings for part i Herein, one execution time model is considered. As an example, a dynamic step calculation expression with a function name foo is defined in an expression (2).

$$cfoo = \frac{4.9 \cdot m_1 + (1.1 \cdot m_2 + x_1) \cdot x_2}{m_3} \quad (2)$$

Where the variables are defined such as:
$m_1$, $m_2$: Machine difference between the numbers of dynamic steps (1 for the reference machine)
$x_1$: Length of data block (KB)
$x_2$: Number of data blocks
$m_3$: MIPS value Then, to adjust the parts and create the application model, the following steps are performed.

(1) Step 701: A plurality of experiments are made by changing x, and a parameter m is determined to reproduce the experimental values with a least square method (the number of experiments can be reduced by employing the design of experiment).

(2) Step 702: The less influential parameter of m is fixed at a constant value, and the model is simplified by reducing the number of machine parameters (employing AIC: Akaike's Information Criterion).

(3) Step 703: The simplified model is defined as a basic model $c_1(x,m)$. Herein, it is required to make verification on plural platforms to reduce the number of parameters.

(4) Step 704: For a parameter adjusting model (expression (3)) for the application program integrated by assembling the parts after creating the basic model, a plurality of experiments are made by changing an input x to estimate $p_1$.

$$T = \sum_{i=1}^{N} n_i \cdot c_i(x, \overline{m}) \cdot p_i \qquad (3)$$

A model having dependence only on an expression (4) is produced through the above process, and is defined as the application model.

$$x, \overline{m} \qquad (4)$$

One method of creating a new software part 104 for use in this invention will be described below. There is a method for creating each software part in which a programming language source 203 is analyzed to create a simulation language source 204. For example, in A.V. Aho et al, "Principles of Compiler Design", Addison-Wesley Publishing Company, pp. 412–415 and 444–445, 1986, if the basic block of the programming language source 203 can be extracted to specify the number of instructions and the number of loops, the initial model can be created by recognizing the structure.

Figure 8:
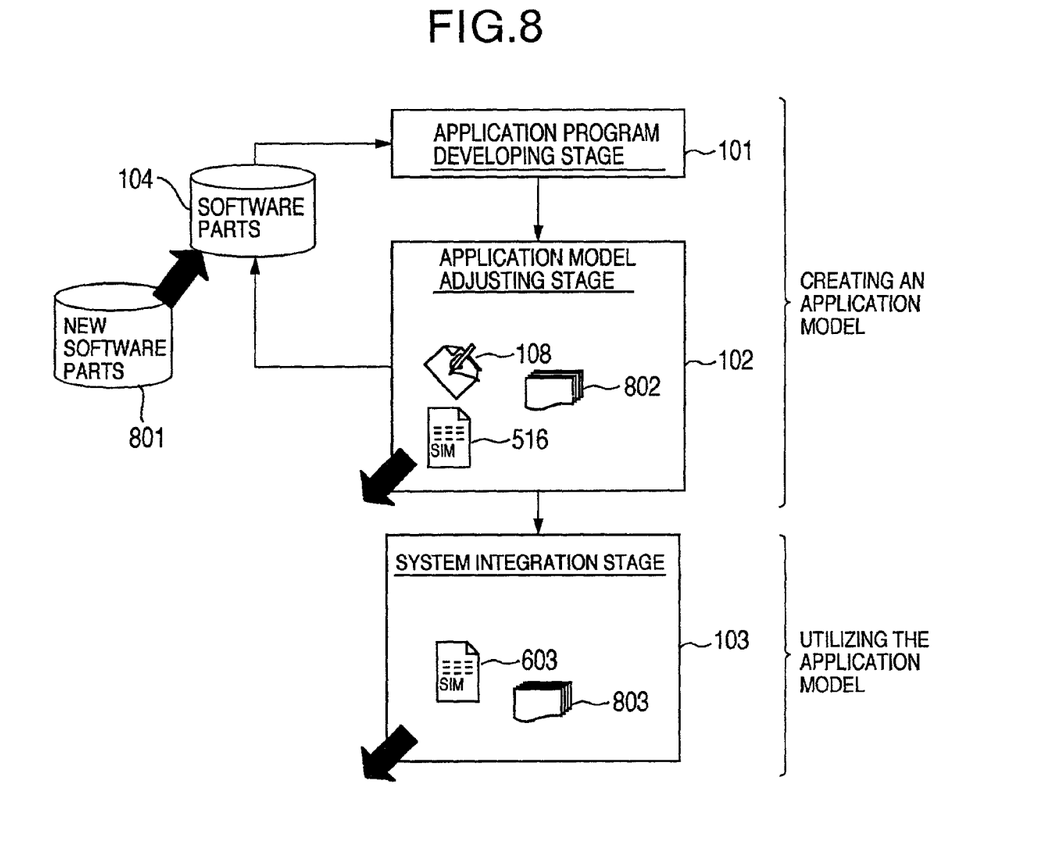
FIG. 8 is an explanatory diagram for explaining a method of sharing and reusing the software parts and its adjusting result.

Referring now to FIG. 8, the software model parts 104 and the method for sharing and reusing the adjusting result in this invention will be described below. In the application program developing stage 101 and the application model adjusting stage 102, the modified software part or its history is stored and the precision of model at the time of reusing. To save the labor for developing the application program and integrate the application model rapidly, it is important to fill up the software parts 104 with the addition of new software parts 801.

In order to enhance the model precision, the adjusting portion 802 is separately circulated and acquired, besides the application program 108 and the adjusted model 516 that result from the model adjusting stage 102, so that the precision of the software parts 104 is enhanced, and the adjusting result can be shared. Similarly, the model adjusted to real environment 603 and the adjusting portion 803 in the system integration stage are possibly circulated.

As described above, in this invention, the application program and the application model are created by combining the software parts, whereby the duplicate development can be avoided, and the operation of the application program can be correctly reflected. Also, the parameter adjusting process is automated by outputting the same log from the application program and the application model, and comparing the logs, whereby the measurement time can be reduced. By preparing the parameter for each software part, it is possible to know the influence of each portion of the application program on the execution environment. Also, the history of parameter adjusting result is circulated independently of the software parts, whereby the knowledge of a difference of the application model in the environments can be shared.

What is claimed is:

1. A Computer-implemented-software model creation method for creating a performance model of an application program for use in a performance simulation for an information system executing said application program, comprising the steps of:

creating a program language source file of said application program via a program language translator from an application program structure description in which processing contents are described by assembling software parts excerpted from a plurality of software parts each describing a routine operation of software;

creating at the same time an application model corresponding to said program via a simulation language translator;

acquiring logs that are output upon a log output instruction embedded into said program language source file created and said application model by executing said application program and by executing a performance simulation using said application model; and comparing a log acquired via the application propram with another log acquired via the application model; and adjusting the application model in accordance with a result of comparison so that the logs become coincident with each other.

2. The software model creation method according to claim 1, wherein the logs output by executing said application program and said performance simulation are compared at the time of applying an adjusted model to a real environment, thereby enabling readjustment of the application model in the real environment.

3. A computer-readable medium including a software part contained therein, the software part comprising:

an interface defining at least accessing method for accessing a method within said software part;

a programming language source and a simulation language source that are accessible via said defined interface, the programming language source and the simulation language source respectively having an instruction statement inserted thereto for outputting a log at a predetermined processing position of a process performed by the software part; and a simulation performance adjusting parameter by which the programming language source and the simulation language source are adjusted.

4. The software part according to claim 3, wherein the predetermined processing position comprises a processing position at which both the programming language source and the simulation language source operate.

5. A Computer-implemented-software model creation method for creating a performance model of an application program comprising the steps of:

preparing an application program structure description in which processing contents are described;

creating an application program language source file via a program language translator in accordance with the application program structure description;

creating an application model corresponding to an application program described by the application program description via a simulation language translator;

acquiring logs that are output upon a log output instruction embedded into said application program created and the application model by executing said application program and by executing a performance simulation using said application model;

comparing a log acquired via the application program with another log acquired via the application model; and adjusting the application model in accordance with a result of the comparison so that the logs become coincident with each other.

6. The software model creation method according to claim 5, wherein the contents in the application program structure description are described by assembling software parts excerpted from a plurality of software parts each describing a routine operation of software.

7. A software part embodied on a computer-readable medium comprising:

an interface defining at least accessing method for accessing a method within the software part;

a programming language source and a simulation language source that are accessible to the software part via the defined interface, the programming language source and the simulation language source respectively having an instruction inserted thereto for outputting a log at a predetermined processing position of a process performed by the software part;

a plurality of simulation performance adjusting parameters by which the programming language source and the simulation language source are adjusted; and a storing unit for storing a history of a simulation performance adjusting parameter result in a list form, the simulation performance adjusting parameters being changed by adjusting an application model including the parameters which have been generated with assembling the software parts in advance, a number of initial values of the simulation performance adjusting parameters being adjusted in accordance with the history.

* * * * *